(12) United States Patent
Bailey et al.

(10) Patent No.: US 12,277,517 B2
(45) Date of Patent: *Apr. 15, 2025

(54) AUTOMATED EVALUATION OF PROJECT ACCELERATION

(71) Applicant: Oracle International Corporation, Redwood Shores, CA (US)

(72) Inventors: Alasdair Bailey, Perth (GB); Meghann Agarwal, Austin, TX (US); Tibor Meinczinger, Davle (CZ); Janet Barnes, Kent (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 17/962,677

(22) Filed: Oct. 10, 2022

(65) Prior Publication Data
US 2023/0034554 A1 Feb. 2, 2023

Related U.S. Application Data

(62) Division of application No. 16/560,414, filed on Sep. 4, 2019, now Pat. No. 11,468,379.

(Continued)

(51) Int. Cl.
*G06Q 10/06* (2023.01)
*G06F 3/14* (2006.01)
(Continued)

(52) U.S. Cl.
CPC ......... *G06Q 10/06313* (2013.01); *G06F 3/14* (2013.01); *G06N 5/02* (2013.01); *G06N 7/01* (2023.01); *G06N 20/00* (2019.01)

(58) Field of Classification Search
CPC ...... G06Q 10/06313; G06F 3/14; G06N 5/02; G06N 7/005; G06N 20/00
See application file for complete search history.

(56) References Cited

U.S. PATENT DOCUMENTS 6,938,007 B1 *  8/2005  Iulianello ............... G06Q 30/04
                                                    705/34
8,527,327 B1 *  9/2013  Lawrence ............ G06Q 10/103
                                                    705/7.41

(Continued)

FOREIGN PATENT DOCUMENTS

WO   WO-2018141012 A1 *  8/2018  ..... G06Q 10/063112

OTHER PUBLICATIONS

J. E. V. Gerk and R. Y. Qassim, "Project Acceleration via Activity Crashing, Overlapping, and Substitution," in IEEE Transactions on Engineering Management, vol. 55, No. 4, pp. 590-601, Nov. 2008, doi: 10.1109/TEM.2008.927786. (Year: 2008).*

(Continued)

*Primary Examiner* — Mehmet Yesildag
*Assistant Examiner* — Jeremy L Gunn
(74) *Attorney, Agent, or Firm* — Tarolli, Sundheim, Covell & Tummino LLP

(57) ABSTRACT

Systems and methods are provided for predicting the effects of acceleration on a probability of a successful completion of a project. Specifically, one or more machine learning algorithms can be trained to predict the success of a project from a plurality of features, including at least one feature that is a function of an end date of the project. A set of projects can be selected from projects having expected end dates that do not fall within a desired window of time, each project having a first probability of success given the current end date. A second probability is calculated for each project at a machine learning platform that quantifies a chance that the project will be successful if completed within the win- (Continued)

dow of time. A difference between the first probability and the second probability is determined for each project, and the projects are selected according to the difference.

13 Claims, 5 Drawing Sheets

Related U.S. Application Data

(60) Provisional application No. 62/748,281, filed on Oct. 19, 2018.

(51) Int. Cl.
*G06N 5/02* (2023.01)
*G06N 7/01* (2023.01)
*G06N 20/00* (2019.01)
*G06Q 10/0631* (2023.01)

(56) References Cited

U.S. PATENT DOCUMENTS

| | | | |
|---|---|---|---|
| 10,679,143 B2* | 6/2020 | Dong | G06N 20/10 |
| 2008/0195451 A1 | 8/2008 | Abram | |
| 2011/0153506 A1 | 6/2011 | Patterson | |
| 2014/0032255 A1* | 1/2014 | Hegazi | G06Q 10/06312 705/7.22 |
| 2016/0086110 A1* | 3/2016 | Ho | G06Q 10/0633 705/7.27 |
| 2016/0171406 A1* | 6/2016 | Sen | G06Q 10/0639 705/7.23 |
| 2016/0260047 A1* | 9/2016 | Duggan | G06Q 10/063114 |
| 2017/0163587 A1* | 6/2017 | Johnson | G06F 9/5088 |
| 2019/0057143 A1* | 2/2019 | Porter | G06F 16/285 |
| 2019/0121855 A1* | 4/2019 | Alexander | G06F 16/248 |
| 2019/0392035 A1* | 12/2019 | Indenbom | G06F 40/284 |

OTHER PUBLICATIONS

Gerk, et al.: "Project Acceleration via Activity Crashing, Overlapping, and Substitution," in IEEE Transactions on Engineering Management, vol. 55, No. 4, pp. 590-601, Nov. 2008, doi: 10.1109/TEM.2008.927786.

* cited by examiner

AUTOMATED EVALUATION OF PROJECT ACCELERATION

RELATED APPLICATIONS

This application is a divisional application of U.S. patent application Ser. No. 16/560,414, filed 4 Sep. 2019, which claims priority from U.S. Provisional Patent Application Ser. No. 62/748,281, filed 19 Oct. 2018; both of which are incorporated herein in their entirety.

TECHNICAL FIELD

This invention relates to the field of artificial intelligence and machine learning, and more specifically, to the application of machine learning to determining the effects of accelerating a project on the probability that the project will be successfully completed.

BACKGROUND

Project management is the practice of initiating, planning, executing, controlling, and closing the work of a team to achieve specific goals and meet specific success criteria at the specified time. A project is a temporary endeavor designed to produce a unique product, service or result with a defined beginning and end that is undertaken to meet unique goals and objectives. The primary challenge of project management is to achieve all of the project goals within a set of constraints, which are generally related to a defined scope of the project, a budget available for the project, and a time available to complete the project.

Machine learning is a field of artificial intelligence that uses statistical techniques to give computer systems the ability to progressively improve performance on a specific task from data, without explicit programming. Machine learning algorithms make data-driven predictions or decisions by building a model from sample inputs. Machine learning is employed in a range of computing tasks where designing and programming explicit algorithms with good performance is difficult or infeasible. Example applications of machine learning include email filtering, detection of network intruders, and computer vision.

SUMMARY OF THE CLAIMED SUBJECT MATTER

In accordance with one example, a computer-implemented method is provided. Metadata for a first subset of a plurality of projects is stored. Each of the first subset of the plurality of projects has an associated value for completion and an expected end date falling within a window of time. In response to a determination that a cumulative value for completing each project of the first subset of the plurality of projects falls below a threshold value, a second subset of the plurality of projects is selected from a third subset of the plurality of projects, representing projects having respective expected end dates that do not fall within the window of time.

The second subset of projects are selected from the third subset of the plurality of projects by assigning a value for completing each project in the third subset of the plurality of projects and retrieving a set of parameters for each project in the third subset of the plurality of projects from a database implemented on a first computer system. At least one of the set of parameters varies as a function of time, and the set of parameters includes a first probability that quantifies a chance that the project will be completed given the expected end date. A second probability is calculated for each project in the third subset of the plurality of projects at a client of a machine learning platform that provides access to a predictive model trained on information about a set of previous projects. The information about the set of previous projects is stored as structured data in a repository accessible to the machine learning platform based on the set of parameters, such that the second probability for each project quantifies a chance that the project will be completed given an end date within the window of time. A difference between the first probability and the second probability is determined for each project in the third subset of the plurality of projects. Projects of the third subset of the plurality of projects are selected, as the second subset of the plurality of projects, based at least in part on the difference in probabilities, such that the value for completing the second subset of the plurality of projects in combination with the cumulative value for completing the first subset of the plurality of projects meets the threshold value.

In accordance with another example, a computer-implemented method is provided. Metadata is stored for a first subset of a plurality of projects. Each of the first subset of the plurality of projects has an associated value for completion and an expected end date falling within a window of time. In response to a determination that a cumulative value of the first subset of the plurality of projects falls below a threshold value, a second subset of the plurality of projects is selected from a third subset of the plurality of projects. The third subset of the plurality of projects represents projects having respective expected end dates that do not fall within the window of time.

The second subset of the plurality of projects is selected from the third subset of the plurality of projects by assigning a value for completing each project in the third subset of the plurality of projects, retrieving a set of parameters for each project in the third subset of the plurality of projects from a database implemented on a first computer system, and calculating a discount factor for the value of each project in the third subset of the plurality of projects. The discount factor represents a loss of value due to completing the project on an end date within the window of time, and is calculated based on the set of parameters via a client of a machine learning platform that provides access to a predictive model trained on information about a set of previous projects, stored as structured data in a repository accessible to the machine learning platform. An adjusted value for each project in the third subset of the plurality of projects is provided as a product of the assigned value for the project and the calculated discount factor. Projects of the third subset of the plurality of projects are selected such that the adjusted value for completing the second subset of the plurality of projects, in combination with the cumulative value for completing the first subset of the plurality of projects, meets the threshold value.

In accordance with yet another example, a system includes a first computer system, comprising at least a first processor and a first non-transitory memory that stores a database comprising a plurality of projects, a given project having a set of parameters and a known end date. A machine learning platform is implemented on a second computer system that includes at least a second processor and a second non-transitory memory. The machine learning platform includes a database interface that receives the set of parameters and the known end date for a selected project of the plurality of projects and a feature extractor that generates at least one feature for a predictive model from the retrieved set of parameters. A status of each of the plurality of projects is defined as one of a plurality of stages, and a feature of the at least one feature being derived from a sequence of stages through which the project has passed. A predictive model is trained on information about a set of previous projects and stored as structured data in a repository accessible to the machine learning platform. The predictive model calculates, from the generated at least one feature and the end date for the selected project, a first probability that the selected project will conclude successfully via a client of a machine learning platform that provides access to the predictive model and, from the generated at least one feature and a modified end date for the selected project, a second probability that the selected project will conclude successfully at the predictive model, wherein the modified end date precedes the known end date. A user interface provides a difference in the first probability and the second probability, representing a risk in accelerating the project from the known end date to the modified end date, at an associated output device.

DETAILED DESCRIPTION

Figure 1:
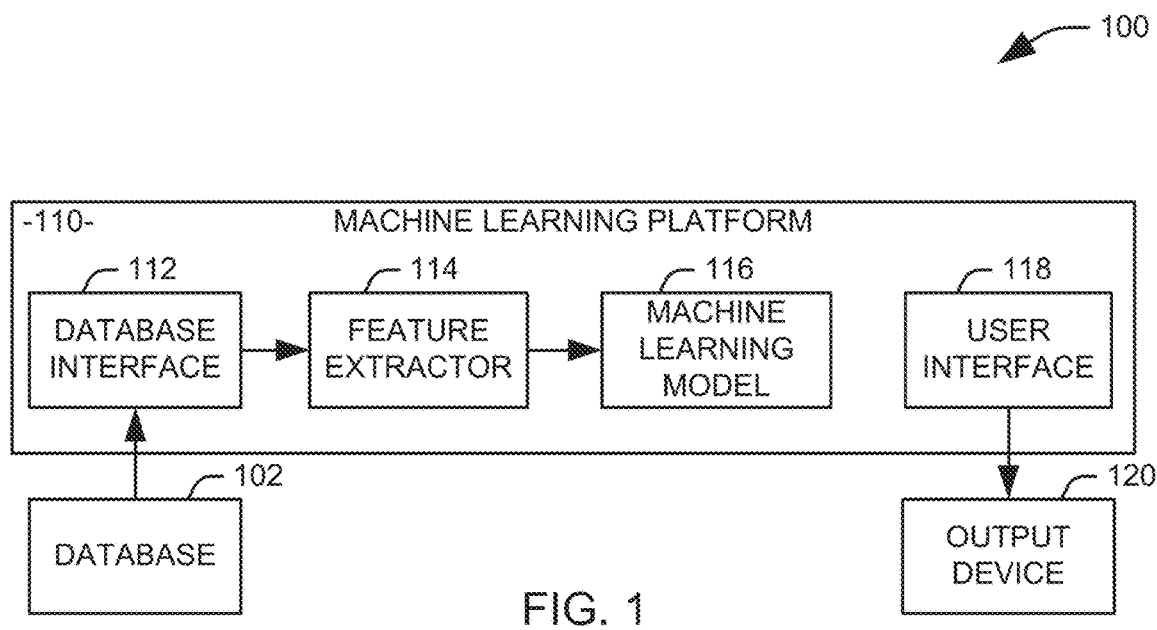
FIG. 1 illustrates a block diagram of a system for evaluating project acceleration.

In practice, constraints of a project may be altered in response to changes in circumstances. For example, changes in the due date for a project, changes to the budget of a project, or loss of available manpower for a project are not uncommon within many organizations due to a shortfall or reallocation of available resources. Tightening these constraints, particularly after a project is initiated, can have an impact on the likelihood that the project will succeed. Accordingly, it can be necessary to determine which of a plurality of projects will bear the loss of resources.

It can be particularly difficult to select projects to be accelerated, such that an end date of the project is moved to a date prior to the projected end date of the project. This can be the result of a need to provide more value, by whatever metric an organization may utilize, in a particular time frame, a response to a departure of a key employee, or in response to a shortage of available resources after a given time. For example, where a sales organization is about to fall short of a sales revenue target for a given financial period, a decision may be made as to which future deal should be closed early in order to fill the shortfall. Alternatively, an organization may attempt to shift focus to one or more substitute projects with a higher probability of success to attempt to meet a productivity metric established by the organization. In some conventional examples, this decision is reached through time-consuming human reviews of all the details of projects and the customers that are being served. In other conventional examples, the decision is reached based solely on the scope and perceived benefits of the project selected for potential acceleration. Both such conventional approaches are inherently based on intuition and heuristics and use only internal factors, which fails to take into account the situation of the customer.

The systems and methods disclosed herein utilize machine learning to predict the effects of acceleration on a probability of a successful completion of a project. Specifically, one or more machine learning algorithms can be trained, for example, on data from previous projects for which the outcome is known, to predict the success of a project from a plurality of features, including at least one feature that is a function of an end date of the project. In one implementation, a given set of features dependent on the end date of the project can be assigned a value based on an original end date of the project, and the given set of features can be provided to the machine learning model to obtain a value representing an original likelihood of success for the project. The process can then be repeated with the values for the given set of features dependent on the end date of the project re-assigned a value based on an accelerated end date, and a difference between the original likelihood and the new likelihood used to evaluate the effects of acceleration on the project. Alternatively, the machine learning algorithm can be trained to determine the difference between the original likelihood and the new likelihood directly, based on another set of features that includes values representing each of an original end date and an accelerated end date.

In another implementation, the machine learning model can seek to quantify a loss incurred, for example, in the quality of the result of a project or a value generated by the project due to accelerating the project. In such a case, the machine learning model can be trained with previous example projects having a known value. Moreover, the difference in value attributable to accelerating the project can be predicted directly via an appropriate model. Alternatively, the value of the project can be predicted twice, once with the features dependent on the end date of the project based on an original end date and once with the features dependent on the end date of the project based on an accelerated end date. The expected loss in value attributable to accelerating the project can be determined from the difference in the two predicted values.

FIG. 1 illustrates a block diagram of a system for evaluating project acceleration 100. A machine learning platform 110 can include one or more cloud servers and can be configured to receive data from at least one associated database 102 at a database interface 112. The data can include, for each of a set of projects, one or more parameters representing the project, for example, a number of days the project has been active, a projected end date for the project, various performance metrics for the project, and a parameter representing a value of the project, for example, as a monetary value or a value assigned by an organization. The database interface 112 can be implemented as an appropriate software program for providing queries to a database and receiving data in response to the queries. In one example, the database interface 112 is implemented as an application program interface (API), such as a API implemented using representational state transfer (REST) technology.

The retrieved data can then be provided to a feature extractor 114. The feature extractor 114 conditions the data received from the database 102. For example, the feature extractor 114 can format the extracted data to a predetermined form. Moreover, the feature extractor 114 can normalize the data, for example, using each of a measure of central tendency and a measure of dispersion determined from historical values for each parameter, to ensure that the data for each parameter is on a similar scale. The feature extractor 114 can provide (output) some or all of the formatted and/or normalized extracted data for use in a set of features that are employable by a machine learning model 116 on the machine learning platform 110. In one implementation, the parameters (data) extracted from the database 102 can be combined to form one or more engineered features that can also be used in the set of features at the machine learning model 116. The set of features provided to the machine learning model 116 will include at least one feature that is dependent on the projected end date of the project. In practice, the end date itself can be used directly as a feature, but it will be appreciated that any of a number of parameters derived from the end date can be utilized for this purpose.

Figure 2:
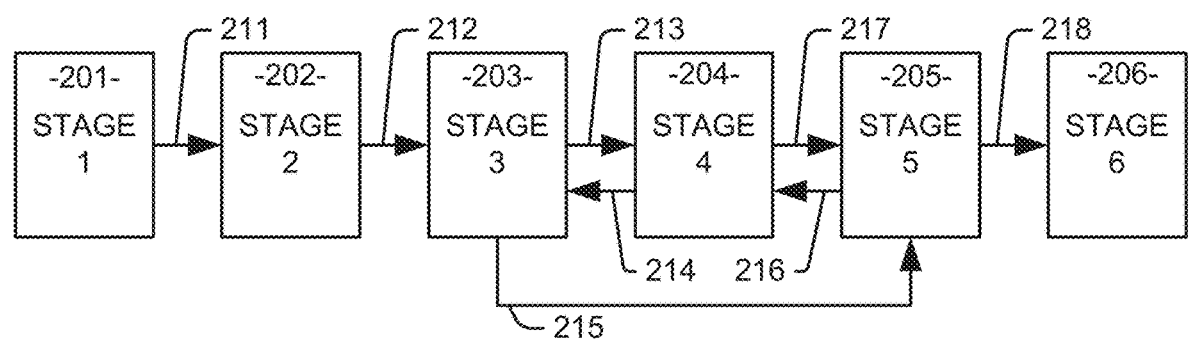
FIG. 2 illustrates an example a project passing through stages.

One set of engineered features can be determined from the history of the stages through which the opportunity has progressed. Each stage can represent a degree of progress of the completion of the opportunity, such as the achievement of one or more benchmarks associated with the project. The determination of these features can be better appreciated with reference to FIG. 2, which illustrates an example a project passing through six stages 201-206. In the illustrated example, the project first advances from stage 1 to stage 2 at 211, advances from stage 2 to stage 3 at 212, and advances from stage 3 to stage 4 at 213. It will be appreciated that the projects can also regress from one stage to another, for example, when work on the project requires revision or a customer ceases to be responsive on a sales opportunity, and the example project regresses from stage 4 to stage 3 at 214. Progress on the project can also be non-sequential, as multiple benchmarks can be met simultaneously or advanced benchmarks can be achieved before those of earlier stages, and at 215, the project advances to stage 5 from stage 3. The example finishes with a regression from stage 5 to stage 4 at 216, an advance from stage 4 to stage 5 at 217, and an advance from stage 5 to stage 6 at 218. For the purpose of the examples below, it will be assumed that each transition 211-218 between stages took five days and that the project has been in stage 6 for five days, but it will be appreciated that in a practical implementation, the time taken between stages would not necessarily, or even, likely be the same.

One feature can be generated to represent the actual sequence of stages through which the opportunity has passed, provided in order. In this instance, the feature would be a text string "1-2-3-4-3-5-4-5-6." A days in current stage feature can be determined as a difference, in days, between the date in which the stage was entered and the current date. In the present example, the project has been in stage 6 for five days. A number of stages feature can be determined as the number of stages having an entry date prior to the current date. In this implementation, the project has passed through nine different stages, and thus nine stages would have an entry date prior to the current date. A number of times in stage parameter can be determined as the number of stages having an entry date prior to the current date and an identifier matching the current stage. In this example, the number of times parameter for stages 3, 4, and 5 would be 2, while the number of times parameter for stages 1, 2, and 6 would be one. A momentum feature can be calculated as the ratio of the number of stages to the age of the project. It will be appreciated that a small value can be added to the age of the opportunity to avoid division by zero on a new project. In this instance, the age of the project would be forty-five days—the forty days for the eight transitions added to the five days that the project has been at stage 6. Accordingly, the momentum would be calculated as the value for the number of stages parameter, 9, divided by the age of the project, 45, for a momentum of 0.2.

The set of features are provided to the machine learning model 116 to quantify an effect of accelerating a project on a likelihood of success of the project or a value of the project according to the extracted set of features. In one implementation, the machine learning model 116 can comprise one or more pattern recognition classifiers, each of which utilize the set of features or a subset of the set of features to determine an appropriate class. It will be appreciated that an ensemble approach, utilizing the outputs of multiple classifier and/or regression models can also be used. The output of each classifier will include a confidence that the set of features are within a particular class, for example, a class representing a successful result.

Each classifier is trained on a plurality of training samples, for example, taken from previous projects with known outcomes, representing various classes of interest. The training process of a given classifier will vary with the classifier's implementation, but the training generally involves a statistical aggregation of training data from a plurality of training samples into one or more parameters defining the classifier model. Any of a variety of classification algorithms can be used for this purpose, including, but not limited to, decision-tree learning, association-rule learning, an artificial neural network, deep learning, inductive logic programming, a support vector machine, clustering, a Bayesian network, reinforcement learning, representation learning, similarity and metric learning, naïve Bayes classification, sparse dictionary learning, a genetic algorithm, rule-based machine learning, self-organized maps, fuzzy logic systems, data fusion processes, ensemble methods, such as boosting and bagging, and random forest classifiers.

A Support Vector Machine (SVM) classifier can utilize a plurality of functions, referred to as hyperplanes, to conceptually divide boundaries in the N-dimensional feature space, where each of the N dimensions represents one associated feature of the feature set, and N is an integer greater than or equal to two. The boundaries define a range of feature values associated with each class. Accordingly, an output class and an associated confidence value can be determined for a given input feature set according to its position in feature space relative to the boundaries. In one implementation, the SVM can be implemented via a kernel method using a linear or non-linear kernel.

An Artificial Neural Network (ANN) classifier comprises a plurality of nodes having a plurality of interconnections. The values from the feature set are provided to a plurality of input nodes. The input nodes each provide these input values to layers of one or more intermediate nodes. A given intermediate node receives output values from some or all of the nodes in the previous layer. The received values are weighted according to a series of weights established during the training of the classifier. An intermediate node translates its received values into a single output according to a transfer function at the node. For example, the intermediate node can sum the received values and subject the sum to a binary step function. A final layer of nodes provides the confidence values for the output classes of the ANN, with each node having an associated value representing a confidence for one of the associated output classes of the classifier.

A rule-based classifier applies a set of logical rules to the extracted features to select an output class. Generally, the rules are applied in order, with the logical result at each step influencing the analysis at later steps. The specific rules and their sequence can be determined from any or all of training data, analogical reasoning from previous cases, or existing domain knowledge. One example of a rule-based classifier is a decision tree algorithm, in which the values of features in a feature set are compared to a corresponding threshold in a hierarchical tree structure to select a class for the feature set. A random forest classifier is a modification of the decision tree algorithm using a bootstrap aggregating, or "bagging" approach. In this approach, multiple decision trees are trained on random samples of the training set, and an average (e.g., mean, median, or mode) result across the plurality of decision trees is returned. For a classification task, the result from each tree would be categorical, and thus a modal outcome can be used.

A naïve Bayes classifier generates, for each of a plurality of classes, a conditional probability that a subject of interest belongs to the class given a set of features representing the subject of interest. The naïve Bayes classifier assumes that each feature is independent of each other feature, that is, the features are not correlated in any way, greatly simplifying the calculation of the conditional probability. Specifically, the conditional probability that the subject of interest is in a given class can be calculated by determining, for each feature in the set of features, the conditional probability that the value for that feature would result given the class. This can be determined during training as the prevalence of that feature value in the training examples for the class. The combined product of the conditional probability values across all features provides the probability for that class. While the naïve Bayes classifier can be used with continuous data, for example, by dividing the data into histogram bins, it is particularly useful for categorical inputs.

A boosting classifier, as the term is used herein, refers to an ensemble approach in which a plurality of relatively simple classifiers, referred to as "weak learners," are applied to a feature set and the final result of the boosting classifier is a weighted linear combination of the results from each of the plurality of classifiers. The weights for the weighted linear combination can be determined during training of the classifiers to minimize a loss function associated with the boosting classifier. The specific loss function varies with the implementation, but is selected to be monotonic and continuously differentiable.

In another implementation, the machine learning model 116 can include a regression model configured to provide calculate an output, for example, representing a probability that the project will be completed successfully, a value of the project, an amount by which the probability of successfully completing the project will be reduced by accelerating the project, or an amount by which the value of the project will be reduced by accelerating the project. In one example, the machine learning model 116 can be utilized to perform a sensitivity analysis using the regression model, such that a magnitude of the effect of one or more features on the at least one parameter can be determined.

In one implementation, the machine learning model 116 can be trained on data from previous projects for which the outcome is known, such that the output of the machine learning model represents the likelihood of the success or failure of a project. In this implementation, each project is evaluated twice. The first evaluation is performed with any features dependent on the projected end date of the project assigned a value based on an original end date of the project to obtain a first value representing an original likelihood of success for the project. The second evaluation is performed with any features dependent on the projected end date of the project assigned a value based on an accelerated end date of the project to obtain a second value representing a likelihood of success for the accelerated project. The difference between the first value and the second value can be used to evaluate the increase in risk incurred in accelerating the project.

In another implementation, the machine learning model 116 can be trained on data from previous projects for which the final value is known, such that the output of the machine learning model represents the value of a project after completion. In this implementation, each project is evaluated twice. The first evaluation is performed with any features dependent on the projected end date of the project with an assigned value based on an original end date of the project to predict a current value for the project. The second evaluation is performed with any features dependent on the projected end date of the project with an assigned value based on an accelerated end date of the project to predict a value for the accelerated project, which can be referred to as an accelerated value. The difference between the current value and the accelerated value can be used to evaluate the cost incurred in accelerating the project.

In a further implementation, the machine learning model 116 can be trained on data from previous projects that includes projects that were accelerated and for which the outcome is known such that the output of the machine learning model represents the likelihood of the success or failure of a project. For these projects, the plurality of features can include values dependent on each of the original end date and the accelerated end date, or simply utilize a feature representing the change in the end date between the original end date and the accelerated end date. The output of the machine learning model can represent a change in the likelihood that the project would succeed attributable to acceleration of the end date.

In still another implementation, the machine learning model 116 can be trained on data from previous projects that includes projects that were accelerated for which the final value is known, such that the output of the machine learning model represents the change in the value of a project due to acceleration. For these projects, the plurality of features can include values dependent on each of the original end date and the accelerated end date, or simply utilize a feature representing the change in the end date between the original end date and the accelerated end date. The output of the machine learning model can represent cost incurred in accelerating the project.

The output of the machine learning model 116 can be provided to a user via a user interface 118 at an associated output device 120, such as a display. Alternatively or additionally, the output of the machine learning model 116 can be stored in the database 102 to guide future decision making related to the project. In one example, it may be determined that an aggregate value of a subset of available projects that are expected to conclude within a given window of time is insufficient to meet the goals of an organization. It will be appreciated that a "subset," as used herein, represents a set of one or more of an available plurality of projects and is not intended to include a proper subset of the plurality of projects. In this instance, a subset of the available projects that will conclude outside of the window of time can be evaluated as discussed above, and a set of one or more projects to be accelerated into the window of time can be selected from these projects.

Figure 3:
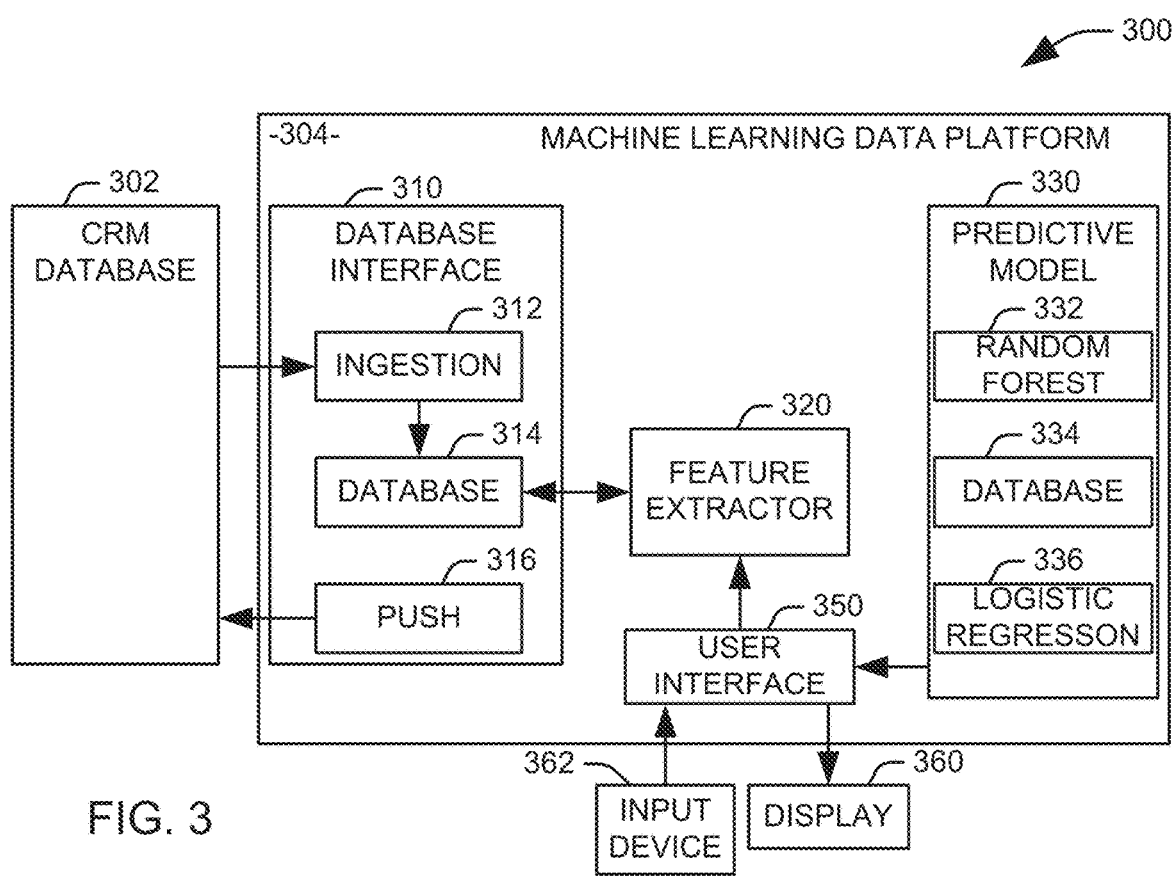
FIG. 3 illustrates one example of a system for evaluating the acceleration of projects.

FIG. 3 illustrates one example of a system 300 for evaluating the acceleration of projects. The illustrated system 300 may be employed, for example, when a first subset of a plurality of projects, each having an associated value for completion and an expected end date falling within a window of time, are determined to have a cumulative value falling below a threshold value. It will be appreciated that the "value" of a given project can include, depending on the nature of the project, a total amount, a quantity of items, a value listed in a proposed agreement, or some other quantifiable benefit that is realized when the project is completed but not when the project is incomplete. The system 300 can be used to select a second subset of the plurality of projects from a third subset of the plurality of projects, representing projects having respective expected end dates that do not fall within the window of time. Specifically, projects from the third subset of projects having a lowest risk or smallest loss in value, as determined by the system 300, can be selected until the value for completing the second subset of projects in combination with the cumulative value for completing the first subset of projects meets the threshold value. The selected second subset of projects can then be accelerated.

In the illustrated system 300, the projects are open sales deals which are in the process of negotiation, and the system is applied when a sales organization is about to fall short of its revenue target for a given financial period to select one or more open deals to attempt to close to meet the revenue target. Accordingly, in this example, the value of each project can be determined as a monetary value of the sale. It will be appreciated that the selection of a set of projects can be performed in response to a user request or upon a determination by the system 300 that the available sales deals expected to close within a given financial period are insufficient to meet a revenue target for that financial period.

The system 300 includes a customer relationship management database 302 that stores data relating to open and completed sales deals for the organization. One example of such a database is the Oracle® Sales Cloud. A machine learning platform 304 includes a database interface 310 that utilizes data from the customer relationship management (CRM) database 302 to evaluate the effects of modifying the end date of open sales deals to a date prior to the projected end date. For each record of a sale or sales opportunity in the customer relationship management database 302, a feature extractor 320 provides a plurality of features representing the sale or opportunity. The set of features includes at least one feature that is dependent on a closing date of the sale.

The database interface 310 includes an ingestion component 312 that periodically retrieves data relating to open sales deals, referred to herein as "opportunities," and stores the data at a database 314 associated with the machine learning platform 310. In practice, the ingestion of opportunity data from the customer relationship management database 302 can be scheduled, such that new data is retrieved periodically from the customer relationship management database without a request from the user or any triggering event within the machine learning platform 310. It will be appreciated that the ingested data can include expired sales opportunities, including both successful sales and sales that were not completed, used for training a machine learning model 330 as well as open sales for analysis. For such opportunities, the ingestion component 312 can retrieve an outcome of the opportunity in addition to feature data.

The feature extractor 320 retrieves data from the database 314 associated with the machine learning platform 310 and conditions the data for use in the machine learning model 330. For example, the feature extractor 320 can de-normalize the relational data from the database 314 into a flat file for use by the machine learning model. The feature extractor 320 also separates the data into two sets, a first set of data for training and updating the machine learning model 330 and a second set of data, for which predictions are returned.

In one implementation, the features extracted from the customer relationship management database 302 can include a monetary value of the deal, a categorical parameter representing a line of business associated with the opportunity, an effective date, month and quarter in which the opportunity is expected to close, each of a certification level, nation, and, where relevant, state, associated with the customer account, a primary competitor associated with the opportunity, and a sales method associated with the opportunity. The extracted data can also include a current sales stage for the opportunity, where a stage of an opportunity is a categorical variable representing progress on the deal. For example, a first stage may indicate that only preliminary contact with the customer has been made, while a final stage may represent that a sale is on the verge of completion. The exact definition of each stage will vary with the implementation and organization utilizing the system 300. In the illustrated example, the stage for each opportunity can be assigned by an individual in the organization handling the sale according to guidelines defined by the organization. It will be appreciated that progression through the stages is not necessarily unidirectional and sequential, such that stages may be skipped in the progress and a sale may be in a given stage multiple times before closing.

The feature extractor 320 can also calculate a number of engineered features. Accordingly, during ingestion of the data at the ingestion component 312, a number of values can be extracted, including a stage history. The stage history can include, for example, the dates in which each stage was entered and exited, a creation date for the opportunity, a day a budget became available for the customer to complete the sale, identifiers for contacts to the customer, a date of a last activity on the opportunity, a projected closing date for the sale, start dates for a plurality of activities, and a number of product units in the sale.

Several useful features can be calculated from these values. An average price per unit can be determined as a ratio of the total value of the sale to the number of product units. Similarly, a number of contacts with the customer associated with the opportunity can be determined from the unique identifiers for the contacts. A number of days that the budget has been available can be determined as a difference, in days, between the date that the budget became available and the current date. An age of the opportunity can be determined as a difference, in days, between the creation date and the current date, and an age at the last activity can be determined as a difference, in days, between the creation date and the start date for the last activity. An expected age of the project can be determined as a difference, in days, between the creation date and the projected end date, and the days until close can be determined as a difference, in days, between the expected age and the opportunity age. A number of activities can be determined as the number of activities having a start date before the current date. The days since the last activity can be determined as a difference, in days, between the opportunity age and the age at the last activity. An average activities parameter can be calculated as the ratio of the number of activities to the age of the opportunity. It will be appreciated that a small value can be added to the age of the opportunity to avoid division by zero on a new opportunity. Further, a constant factor can be multiplied with the ratio to maintain consistency with other continuous features.

Another set of calculated parameters can be determined from the history of the stages through which the opportunity has progressed. Each stage can represents a degree of progress of the completion of the opportunity, such as a benchmark. Accordingly, each stage can represent an event that is typically associated with a particular level of progress of the opportunity. One feature can be generated to represent the actual sequence of stages through which the opportunity has passed, provided in order. A days in current stage feature can be determined as a difference, in days, between the date in which the stage was entered and the current date. A number of stages feature can be determined as the number of stages having an entry date prior to the current date. A number of times in stage parameter can be determined as the number of stages having an entry date prior to the current date and an identifier matching the current stage. A momentum feature can be calculated as the ratio of the number of stages to the age of the opportunity. It will be appreciated that a small value can be added the age of the opportunity to avoid division by zero on a new opportunity.

The flattened data is provided as a feature set to the machine learning model 330. In the illustrated implementation, the machine learning model 330 comprises a random forest classifier 332, a boosting classifier 334, a logistic regression model 336 that receives the outputs of the random forest classifier and the boosting classifier as independent variables. The classifiers 332 and 334 and the regression model 336 can be trained as an ensemble, based on the known success or failure of the projects in the training set, to provide a model that produces, as an output, a likelihood of success for a given sales opportunity based on the extracted set of features. It will be appreciated that the training data can be stored as structured data in a repository (not shown) on the machine learning platform 304. Once a likelihood has been determined for a given opportunity, the likelihood can be provided to a push component 316 at the database interface 310 that stores the likelihood in the customer relationship management database 302. This can be performed at regular intervals, such that each opportunity has an associated probability of success based upon the projected end date.

When it is desirable to accelerate a sale, a set of sales having projected end dates outside of the current financial period can be selected and provided to the feature extractor 320 with projected end dates modified to fall within the current financial period. The feature set is extracted and a likelihood associated with the modified end date can be generated at the machine learning model 330. Each of the original likelihood and the likelihoods associated with the modified end date can be provided to a user interface 350 that provides either the two likelihoods and/or a value derived from the likelihoods (e.g., a difference between the two likelihoods) to a user at an associated display 360.

Figure 4:
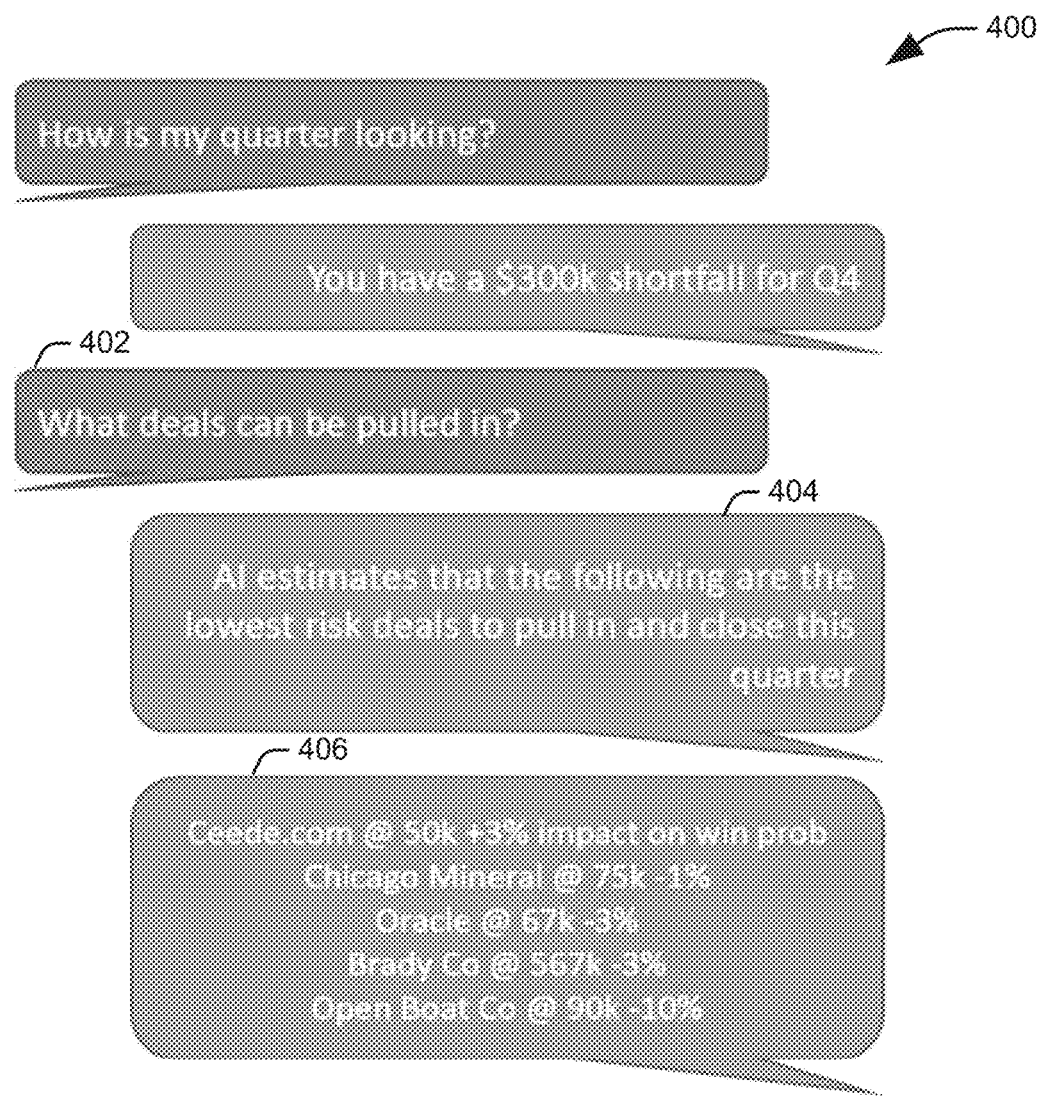
FIG. 4 illustrates one example of a chat interface for the system of FIG. 3.

In one implementation, the user interface 350 can include a chat interface that employs natural language processing to provide conditional automated posts to a user based upon certain queries. In the illustrated implementation, a user can, via an input device 362, instruct the feature extractor 320 to retrieve data for a set of sales deals closing within a predetermined window and send them to the machine learning model 330 for evaluation, as described above, in response to a query from the user. FIG. 4 illustrates one example of this chat interface 400. At 402, a user asks "What deals can be pulled in?", triggering the user interface 350 to request evaluation of a set of deals. Once values from the machine learning model are returned, a predetermined response is issued at 404, the opportunities can be ranked in order of the change to the likelihood of closing the sale, and a selected number of top deals can be listed with their value and change in likelihood at 406.

Figure 5:
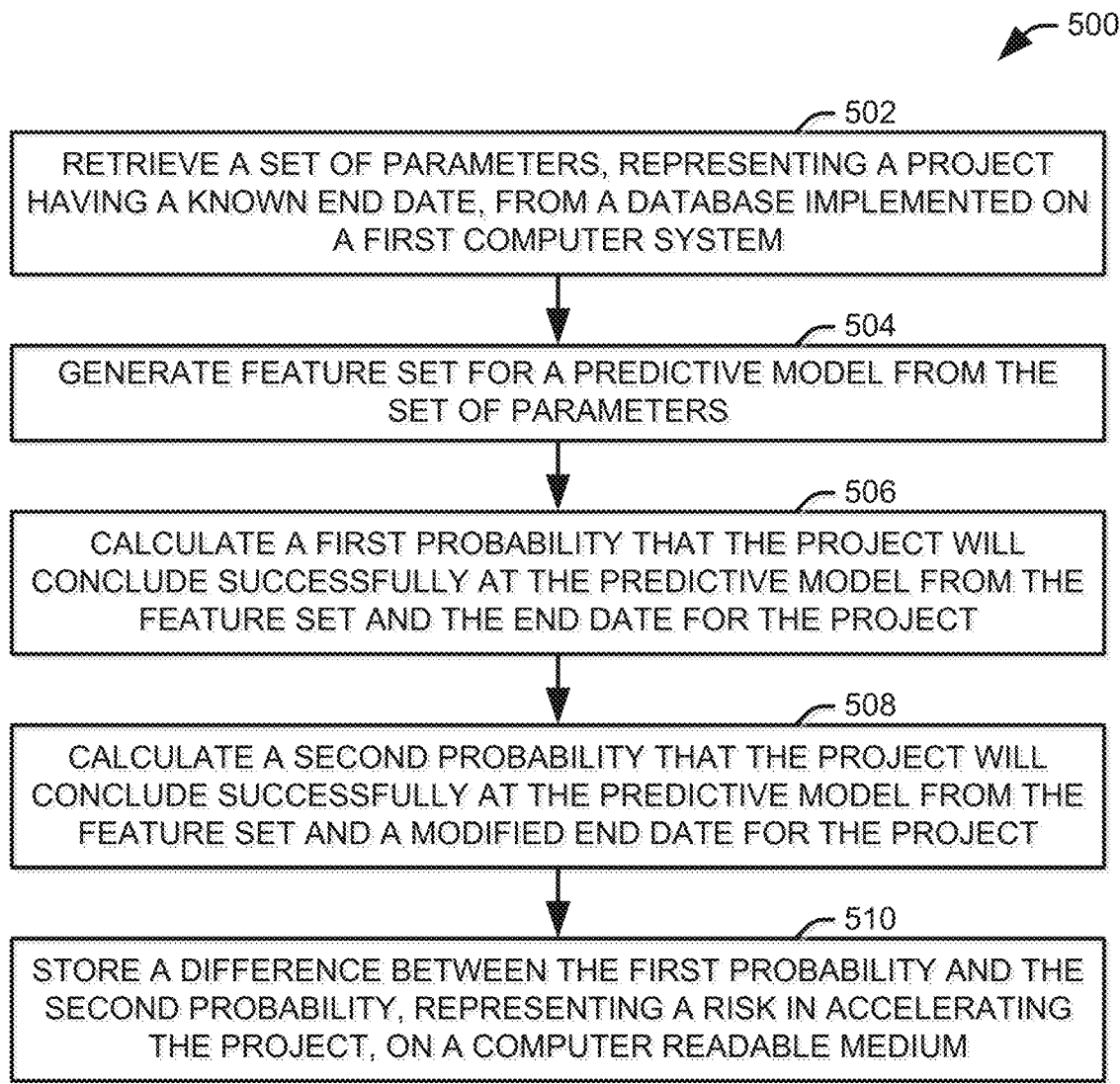
FIG. 5 a method for evaluating risk from acceleration of a project.
Figure 6:
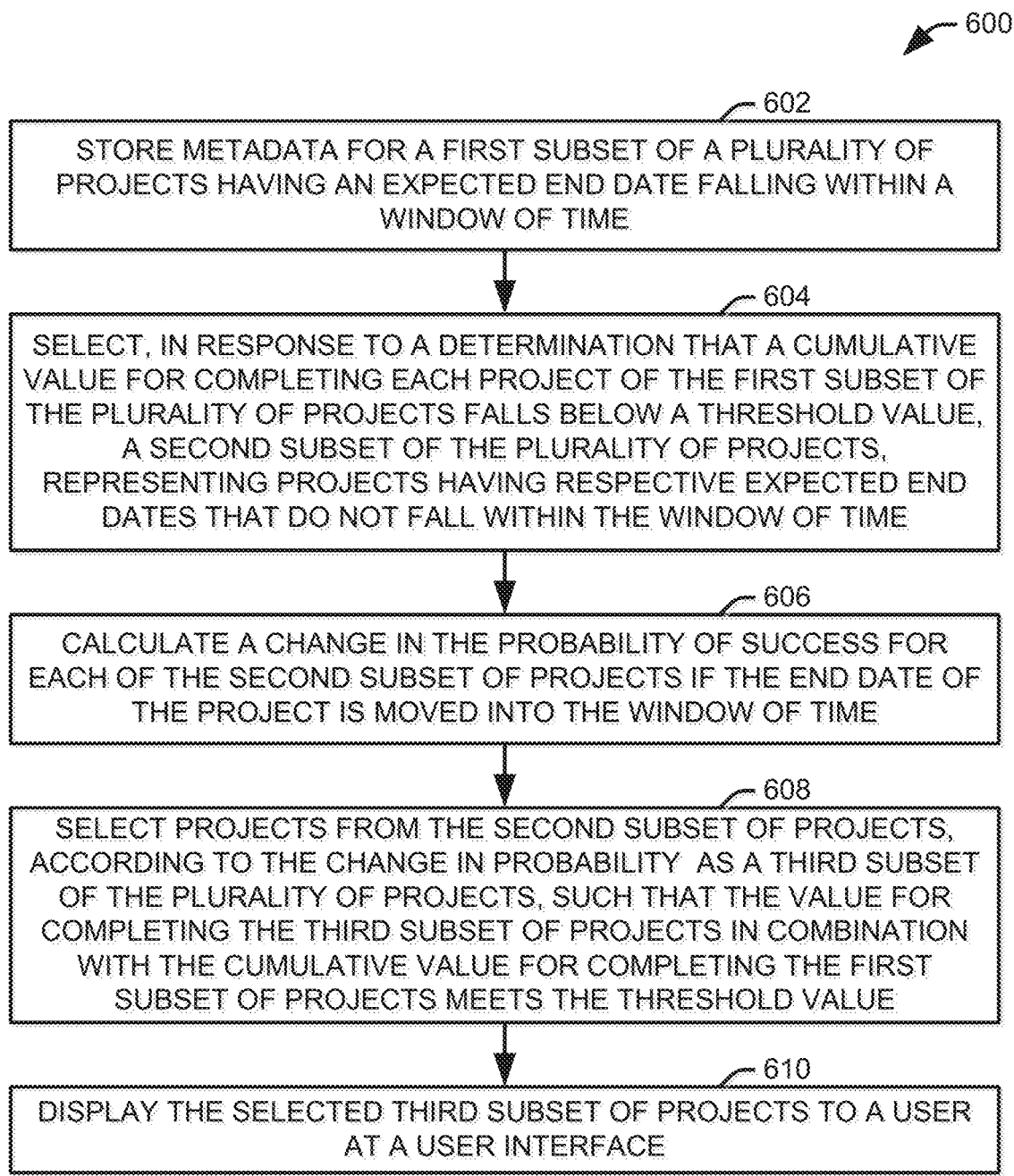
FIG. 6 illustrates a method for selecting projects for acceleration according to a determined risk.
Figure 7:
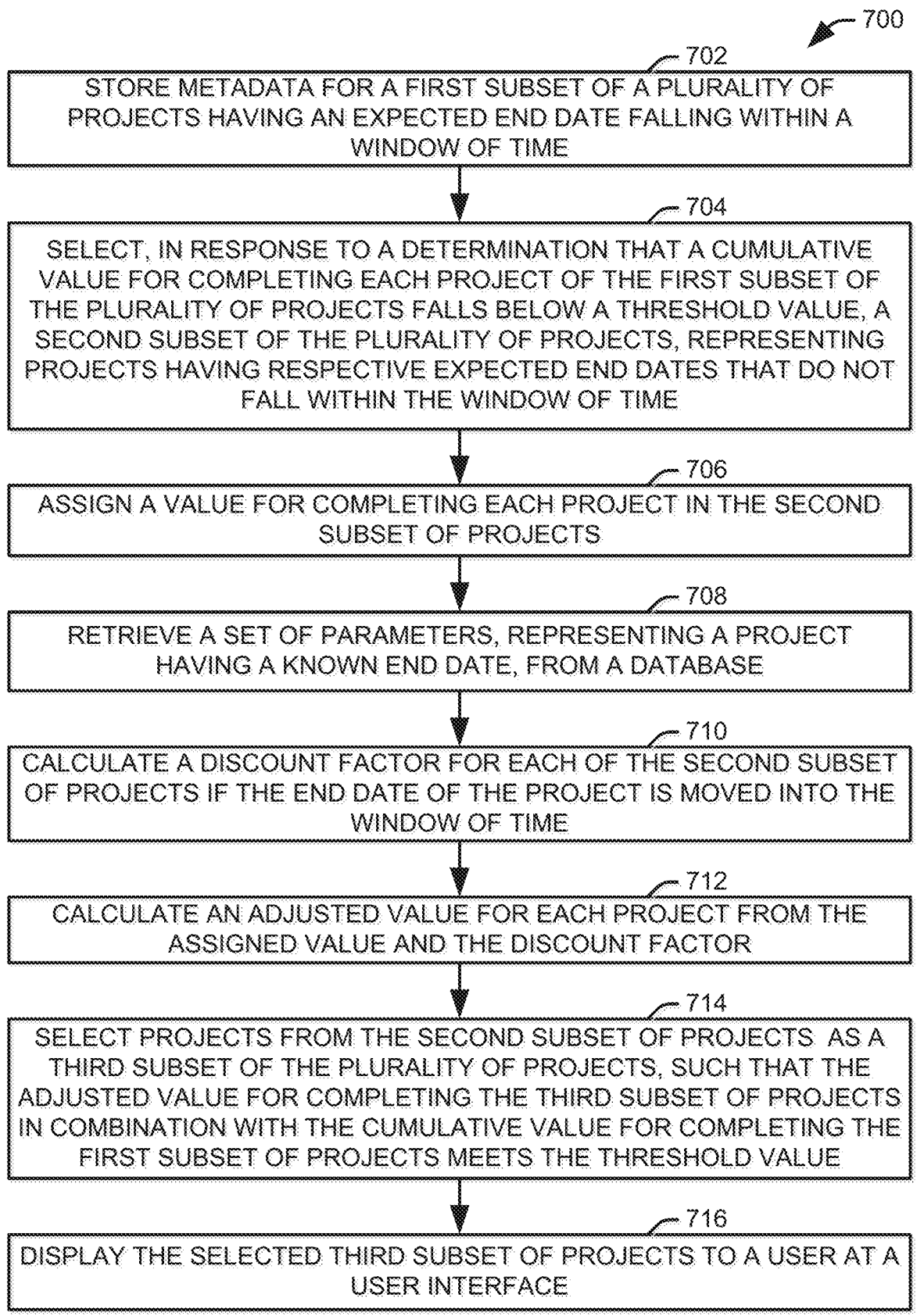
FIG. 7 illustrates a method for selecting projects for acceleration according to a determined cost.

In view of the foregoing structural and functional features described above in FIGS. 1-4, example methods will be better appreciated with reference to FIGS. 5-7. While, for purposes of simplicity of explanation, the methods of FIGS. 5-7 are shown and described as executing serially, it is to be understood and appreciated that the present invention is not limited by the illustrated order, as some actions could in other examples occur in different orders and/or concurrently from that shown and described herein.

FIG. 5 illustrates a method 500 for evaluating risk from acceleration of a project. At 502, a set of parameters, representing a project having a known end date, are retrieved from a database implemented on a first computer system. At 504, a feature set for a predictive model is generated from the retrieved set of parameters. Example features can include a category of products associated with the project, a number of days elapsed between a date at which a budget was approved for the project and a current date, and a number of days since a last activity on the project. In the illustrated method 500, a status of each project is defined as one of a plurality of stages, and a feature in the feature set is derived from a sequence of stages through which the project has passed. For example, a feature can be calculated as a ratio of a number of stages through which the project has passed to a number of days that have passed since the project began, a number of times the project has passed through a given stage, or a parameter directly representing the sequence of stages through which the project has passed.

At 506, a first probability that the project will conclude successfully is calculated at the predictive model from the feature set and the end date for the project. In one example, a client of a machine learning platform that provides access to the predictive model can receive the at least one feature and the end date and provide this data to the predictive model. The predictive model is trained on information about a set of previous projects stored as structured data in a repository accessible to the machine learning platform. In one implementation, the first probability is calculated by generating a first prediction from the set of parameters at a random forest classifier, generating a second prediction from the set of parameters at a boosting classifier, calculating the first probability as a weighted linear combination of the first metric and the second metric using weights provided via a logistic regression model. At 508, a second probability that the project will conclude successfully is calculated at the predictive model from the calculated at least one feature and a modified end date for the project. It will be appreciated that in determining the risk of accelerating the project, the modified end date will precede the known end date. At 510, a difference between the first probability and the second probability, representing a risk in accelerating the project from the known end date to the modified end date, is stored at a non-transitory computer readable medium.

FIG. 6 illustrates a method 600 for selecting projects for acceleration according to a risk of acceleration of a project. At 602, metadata is stored for a first subset of a plurality of projects, each having an associated value for completion and an expected end date falling within a window of time. For example, the first subset can represent a set of sales closing within a given financial period for an organization or a set of projects for a team of employees expected to be completed prior to an annual review. At 604, in response to a determination that a cumulative value for completing each project of the first subset of the plurality of projects falls below a threshold value, a second subset of the plurality of projects, representing projects having respective expected end dates that do not fall within the window of time, is selected for evaluation of the risk of accelerating the projects. For example, the second subset of projects can include sales that are expected to close relatively soon after the end of the financial period or projects that are expected to be completed shortly after the annual review. In one implementation, in which responsibility for the plurality of projects is divided across a plurality of entities, the selected projects can be filtered such that each project in the second subset of the plurality of projects is associated with a relevant entity of the plurality of entities. For example, one department for a large organization will not be provided with projects from another department outside of their purview to select for acceleration.

At 606, a change in the probability of success is calculated for each of the second subset of projects that would be expected if the end date of the project were moved into the window of time. For example, this can be accomplished via the method of FIG. 5. Alternatively, an existing probability of success can be determined in advance and stored as a parameter for the project, for example, in an associated database. In this implementation, only a revised probability of success, associated with the accelerated end date for the project, would need to be determined to determine the change in the probability of success. At 608, projects from the second subset of the plurality of projects are selected as a third subset of the plurality of projects, at least in part according to the difference in probability, such that the value for completing the third subset of the plurality of projects in combination with the cumulative value for completing the first subset of the plurality of projects meets the threshold value. In one example, projects with the lowest difference in probability are selected. At 610, the third subset of the plurality of projects is displayed to a user at a user interface. In one implementation, the graphical user interface has a selected format for that user. The graphical user interface has an interface for receiving feedback from the user about the displayed projects, and the selected format of the graphical user interface for the user can be adjusted according to the received feedback. In another implementation, the graphical user interface can include a chat interface incorporating natural language processing, such that the chat interface can provide the third subset of the plurality of projects in response to a question inputted by the user.

FIG. 7 illustrates a method 700 for selecting projects for acceleration according to a cost of acceleration of a project. At 702, metadata is stored for a first subset of a plurality of projects, each having an associated value for completion and an expected end date falling within a window of time. At 704, in response to a determination that a cumulative value for completing each project of the first subset of the plurality of projects falls below a threshold value, a second subset of the plurality of projects, representing projects having respective expected end dates that do not fall within the window of time, is selected for evaluation of the cost of accelerating the projects. In one implementation, in which responsibility for the plurality of projects is divided across a plurality of entities, the selected projects can be filtered such that each project in the second subset of the plurality of projects is associated with a relevant entity of the plurality of entities.

At 706, a value is assigned for completing each project in the second subset of the plurality of projects. This value can be monetary, for example, the revenue received upon a successful sale, or set by an organization to reflect the value of the project to the organization. At 708, a set of parameters for each project in the second subset of the plurality of projects is retrieved from a database implemented on a first computer system. At 710, a discount factor for the value of each project in the second subset of the plurality of projects is calculated, representing a loss of value due to completing the project within the window of time, based on the set of parameters at a predictive model trained on information from a set of previous projects. For example, attempting to accelerate a sale with a customer may require some degree of discount to the sale price. In one example, a client of a machine learning platform that provides access to the predictive model can receive the at least one feature and the end date and provide this data to the predictive model. The predictive model is trained on information about a set of previous projects stored as structured data in a repository accessible to the machine learning platform. The predictive model can be trained to predict the degree to which the value of a project is discounted based on previous projects, including projects for which the expected end date had been modified.

At 712, an adjusted value is provided for each project in the third subset of the plurality of projects as a product of the assigned value for the project and the calculated discount factor. At 714, a third subset of the plurality of projects are selected from the second subset of the plurality of projects such that the adjusted value for completing the third subset of the plurality of projects in combination with the cumulative value for completing the first subset of the plurality of projects meets the threshold value. At 716, the third subset of the plurality of projects is displayed to a user at a user interface. In one implementation, the graphical user interface has a selected format for that user. The graphical user interface has an interface for receiving feedback from the user about the displayed projects, and the selected format of the graphical user interface for the user can be adjusted according to the received feedback. In another implementation, the graphical user interface can include a chat interface incorporating natural language processing, such that the chat interface can provide the third subset of the plurality of projects in response to a question inputted by the user.

Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. In one example, the machine learning platform 304 of FIG. 3 can be implemented on one or more cloud servers and can be configured to receive feature sets for analysis from one or more client systems. Specifically, the machine learning platform 304 can be implemented on a multi-tenant cloud services platform system such that multiple clients can log in to a central location to access a server or collection of servers, but where the specific access to data, for example, the database 314, training data for the predictive model 330 and specific parameters for the predictive model 330 is controlled depending on which client has authenticated to the cloud storage system. For example, each client might be restricted from accessing data of other clients, and the multi-tenant cloud services platform system may keep track of how many resources (e.g., processor cycles, storage, or time spent using instances of cloud-hosted software applications) have been used by each of the clients, and bill the clients based on the resource usage.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

Additional information on an example implementation of the systems and methods described herein is provided in Appendix A.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A computer-implemented method comprising:
   storing metadata for a first subset of a plurality of projects, each having an associated value for completion and an expected end date falling within a window of time, wherein the value for completion of a given project is a quantifiable benefit that is realized when the project is completed but not when the project is incomplete;
   selecting, in response to a determination that a cumulative value for completion of each project of the first subset of the plurality of projects falls below a threshold value, a second subset of the plurality of projects from a third subset of the plurality of projects, representing projects having respective expected end dates that do not fall within the window of time, wherein the selecting of the second subset of the plurality of projects from the third subset of the plurality of projects comprises:
   assigning a value for completing each project in the third subset of the plurality of projects;
   retrieving a set of parameters for each project in the third subset of the plurality of projects from a database implemented on a first computer system;
   calculating a discount factor for the value of each project in the third subset of the plurality of projects, representing a loss of value due to completing the project on an end date within the window of time, based on the set of parameters via a client of a machine learning platform that provides access to a predictive model trained on information about a set of previous projects, stored as structured data in a repository accessible to the machine learning platform;
   providing an adjusted value for each project in the third subset of the plurality of projects as a product of the assigned value for the project and the calculated discount factor;
   selecting projects of the third subset of the plurality of projects, as the second subset of the plurality of projects, such that the adjusted value for completing the second subset of the plurality of projects in combination with the cumulative value for completing the first subset of the plurality of projects meets the threshold value;
   changing the expected end date for each of the third subset of projects to the end date within the window of time;
   determining an outcome for each of the third subset of projects; and
      retraining the predictive model using the set of parameters for each of the third subset of projects and the determined outcome for each of the third subset of projects.

2. A non-transitory computer readable medium storing machine readable instructions that are executed by an associated processor to perform the method of claim 1.

3. The non-transitory computer readable medium of claim 2, wherein the non-transitory computer readable medium is part of a cloud services platform.

4. The computer-implemented method of claim 1, wherein a status of each project of the plurality of projects is defined as one of a plurality of stages, each stage representing a degree of progress of the project toward completion, and one of the set of parameters for each project is calculated as a ratio of a number of stages through which the project has passed to a number of days that have passed since the project began.

5. The computer-implemented method of claim 1, wherein a status of each project of the plurality of projects is defined as one of a plurality of stages, each stage representing a degree of progress of the project toward completion, and one of the set of parameters for each project represents a sequence of stages through which the project has passed.

6. The computer-implemented method of claim 1, wherein a status of each project of the plurality of projects is defined as one of a plurality of stages, each stage representing a degree of progress of the project toward completion, and one of the set of parameters for each project being derived from a number of times that the project has been in a given one of the plurality of stages.

7. The computer-implemented method of claim 1, wherein one of the set of parameters for each project is a number of days elapsed between a date at which a budget was approved for the project and a current date.

8. The computer-implemented method of claim 1, further comprising:
displaying the second subset of the plurality of projects to a user in a graphical user interface having a selected format for that user;
receiving feedback from the user about the displayed second subset of the plurality of projects; and
adjusting the selected format of the graphical user interface for the user according to the received feedback.

9. The computer-implemented method of claim 1, wherein the plurality of projects are divided across a plurality of entities, and each project in the third subset of the plurality of projects is associated with a given entity of the plurality of entities.

10. The computer-implemented method of claim 1, wherein one of the set of parameters for each project is a category of products associated with the project.

11. The computer-implemented method of claim 1, further comprising providing the second subset of the plurality of projects to a user via a chat interface incorporating natural language processing, such that the chat interface can provide the second subset of the plurality of projects in response to a question inputted by the user.

12. The computer-implemented method of claim 1, wherein the machine learning platform updates the repository according to the discount factor for each project and an outcome for each project once the project has ended.

13. The computer-implemented method of claim 1, wherein calculating the discount factor for each project in the third subset of the plurality of projects based on the set of parameters at the machine learning platform comprises:
generating a first metric from the set of parameters at a random forest classifier;
generating a second metric from the set of parameters at a boosting classifier; and calculating the discount factor as a weighted linear combination of the first metric and the second metric.

* * * * *